United States Patent
Hsieh et al.

(10) Patent No.: US 10,275,692 B2
(45) Date of Patent: Apr. 30, 2019

(54) IMAGE RECOGNIZING METHOD FOR PREVENTING RECOGNITION RESULTS FROM CONFUSION

(71) Applicant: Viscovery (Cayman) Holding Company Limited, Grand Cayman (KY)

(72) Inventors: Shao-Hang Hsieh, Taipei (TW); Yen-Cheng Chen, Taipei (TW)

(73) Assignee: VISCOVERY (CAYMAN) HOLDING COMPANY LIMITED, Grand Cayman (KY)

( * ) Notice: Subject to any disclaimer, the term of this patent is extended or adjusted under 35 U.S.C. 154(b) by 129 days.

(21) Appl. No.: 15/434,332

(22) Filed: Feb. 16, 2017

(65) Prior Publication Data

US 2018/0075325 A1    Mar. 15, 2018

(30) Foreign Application Priority Data

Sep. 13, 2016  (TW) .............................. 105129729 A

(51) Int. Cl.
   *G06K 9/70*   (2006.01)
   *G06K 9/62*   (2006.01)
   *G06K 9/00*   (2006.01)

(52) U.S. Cl.
   CPC ....... *G06K 9/6282* (2013.01); *G06K 9/00718* (2013.01); *G06K 9/6256* (2013.01)

(58) Field of Classification Search
   CPC . G06K 9/6282; G06K 9/00718; G06K 9/6256
   See application file for complete search history.

(56) References Cited

U.S. PATENT DOCUMENTS 8,819,024 B1    8/2014  Toderici et al.
2004/0234128 A1*  11/2004  Thiesson ............... G06K 9/222
                                                       382/186

(Continued)

FOREIGN PATENT DOCUMENTS

CN    101965576 A    2/2011
TW    200741580 A    11/2007

(Continued)

OTHER PUBLICATIONS

Office Action dated Dec. 14, 2017 of the corresponding Taiwan patent application No. 105129729.

*Primary Examiner* — Solomon G Bezuayehu
(74) *Attorney, Agent, or Firm* — Chun-Ming Shih; HDLS IPR Services

(57) ABSTRACT

An image recognizing method adopted by a platform is disclosed. The method first receives multiple targets to be recognized at the platform, and inquiries a pre-established semantic tree by reference to the targets for determining if the recognition results of the multiple targets will cause confusion or not. If confusion is not foreseeable, the method obtains respectively a parent-classifier corresponding to each parent-category of each of the targets, and uses the parent-classifiers directly to perform a recognition action to the targets. Otherwise, the method obtains respectively multiple child-classifiers corresponding to multiple subcategories below each of the targets, and uses the multiple child-classifiers to perform such recognition action to the targets.

7 Claims, 8 Drawing Sheets

(56) References Cited

U.S. PATENT DOCUMENTS

| | | | |
|---|---|---|---|
| 2006/0120609 A1* | 6/2006 | Ivanov | G06K 9/00711 |
| | | | 382/224 |
| 2008/0162561 A1 | 7/2008 | Naphade et al. | |
| 2008/0240504 A1* | 10/2008 | Grosvenor | G06K 9/6256 |
| | | | 382/103 |
| 2009/0208106 A1 | 8/2009 | Dunlop et al. | |
| 2011/0299735 A1* | 12/2011 | Anisimovich | G06K 9/468 |
| | | | 382/103 |
| 2012/0254197 A1 | 10/2012 | Kuzmin | |
| 2012/0308076 A1* | 12/2012 | Piekniewski | G06N 3/049 |
| | | | 382/103 |
| 2014/0241618 A1* | 8/2014 | Simske | G06K 9/6262 |
| | | | 382/159 |
| 2018/0025248 A1* | 1/2018 | Shan | G06K 9/222 |
| | | | 382/189 |

FOREIGN PATENT DOCUMENTS

| | | |
|---|---|---|
| TW | 201222430 A1 | 6/2012 |
| TW | 201601072 A | 1/2016 |

* cited by examiner

IMAGE RECOGNIZING METHOD FOR PREVENTING RECOGNITION RESULTS FROM CONFUSION

BACKGROUND OF THE INVENTION

1. Technical Field

The technical field relates to an image recognizing method, and in particular relates to an image recognizing method that can prevent recognition results from confusion.

2. Description of Related Art

In order to automatically recognize one or more targets, such as faces, objects, scenes, etc. in images or videos through artificial intelligence (AI) technology, the recognized targets need to be identified, and one or more classifiers respectively corresponding to the targets need to be trained in advance. When performing an analyzing action to the images or the videos, more classifiers are used to automatically analyze and compare the images or the videos to identify if one or more of the targets are present in the images or the videos.

FIG. 1 is a diagram showing a training of related-art classifiers. In one embodiment, if a user needs to recognize a target which comprises two objects such as "Phone" and "Monitor", a phone classifier 1 needs to be trained in advance for a "Phone" category, and a monitor classifier 2 also needs to be trained for a "Monitor" category. In particular, engineers need to feed training materials 11 related to phones, such as any type of information (photos, videos, etc.) related to "Phone monitor", "Back cover of phone", "Phone shield", etc., to the phone classifier 1, so as to make the phone classifier 1 understand the definition of the phone category including what kind of elements comprise the category.

Similarly, the engineers need to feed other training materials 21 related to monitors, such as any type of information related to "TV monitor", "Computer monitor", "Phone monitor", etc., to the monitor classifier 2, so as to make the monitor classifier 2 understand the definition of the monitor category including what kind of elements comprise the category.

As mentioned in the embodiment shown of FIG. 1, however, the training materials 11 for the phone classifier 1 include "Phone monitor" (means a "Phone monitor" subcategory is included below the phone category), and the other training materials 21 for the monitor classifier 2 also include "Phone monitor" (means a "Phone monitor" subcategory is also included below the Monitor category). As a result, the phone classifier 1 will recognize an object that includes a phone monitor as a phone after being trained, and the monitor classifier 2 will recognize the same object that includes the phone monitor as a monitor after being trained. Therefore, the duplicated recognition results of the phone category and the monitor category will cause confusion.

For example, if a user searches on a recognition platform for a video that has a segment in which a phone appears, but the monitor classifier 2 recognizes the segment in the video that a phone monitor appeared over the phone classifier 1 and defines the phone monitor as the monitor category when performing an analysis action, the segment will not be provided to the user and the search will be a failure. As such, a confusion of the recognition results will cause a failure in recognition, and reduces the accuracy rate of performing an automatic recognition operation.

SUMMARY OF THE INVENTION

The present invention is to provide an image recognizing method for preventing recognition results from confusion, which may automatically adjust and choose classifiers adopted to perform an analysis action according to targets to be recognized, so as to prevent recognition results from confusion.

In one of the exemplary embodiments, the method of the present invention first receives multiple targets to be recognized at the platform, and inquiries a pre-established semantic tree by reference to the targets for determining if the recognition results of the multiple targets will cause confusion or not. If confusion is not foreseeable, the method obtains respectively a parent-classifier corresponding to each parent-category of each of the targets, and uses the parent-classifiers directly to perform a recognition action to the targets. Otherwise, the method obtains respectively multiple child-classifiers corresponding to multiple subcategories below each of the targets, and uses the child-classifiers to perform such recognition action to the targets.

Compared with related art, the recognition platform can determine whether the targets to be recognized received from the user will cause confusion by each other in recognition results, then decides to use the parent-classifiers directly corresponding to the parent-categories of the targets to perform the recognition action, or use the child-classifiers corresponding to the subcategories below the targets to perform the recognition action. Therefore, confusion of the multiple recognition results can be avoided even if the multiple targets are highly related to each other.

BRIEF DESCRIPTION OF THE INVENTION

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

One aspect of the present invention discloses an image recognizing method for preventing recognition results from confusion (refers to as the method hereinafter); the method is adopted by an off-line recognition system or an on-line recognition platform. In the following embodiments, the on-line recognition platform which connects to the Internet will be taken into account in examples for further discussion.

The recognition platform may perform an analysis action to static images and dynamic videos, so as to recognize different types of targets appearing in each of the images and the videos. For example, a recognition platform adopting FITAMOS system developed by Viscovery Pte, Ltd. may recognize at least seven types of targets from the images and the videos including Faces, Images/Trademarks, Texts, Audio, Motions, Objects and Scenes.

In one aspect of the present invention, before performing a recognition action to multiple targets simultaneously, the recognition platform inquires a pre-established semantic tree in advance to determine if multiple recognition results of the multiple targets will cause confusion or not. Next, the recognition platform decides to use upper classifiers directly corresponding to parent-categories of the multiple targets to perform the recognition action or to use lower classifiers corresponding to subcategories below the multiple targets to perform the recognition action according to the determination.

Figure 1:
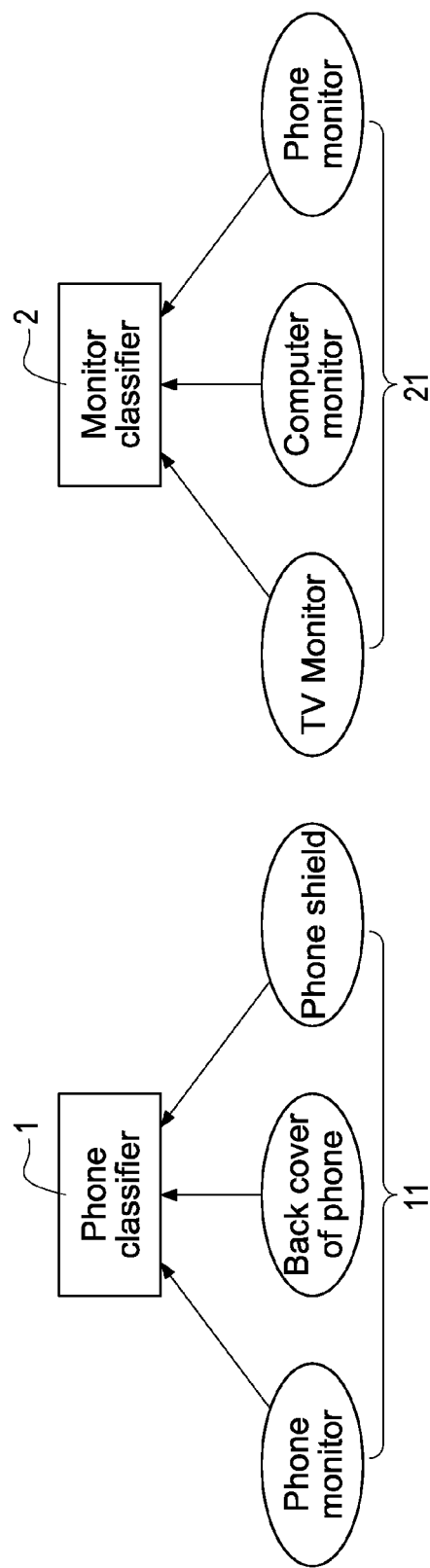
FIG. 1 is a diagram showing a training of classifiers of related art.
Figure 2:
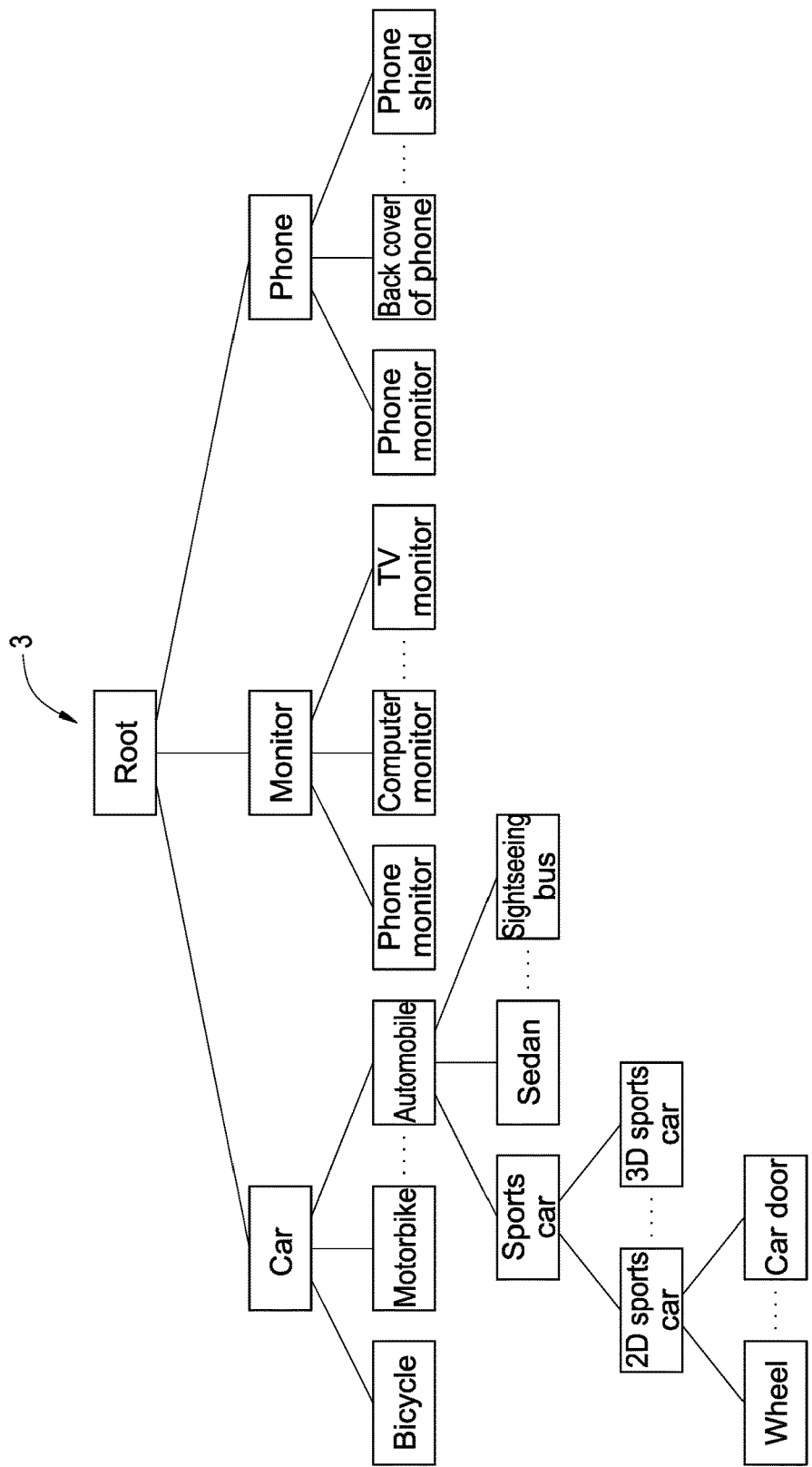
FIG. 2 is a diagram showing semantic tree according to one embodiment of the present invention.

FIG. 2 is a diagram showing a semantic tree according to one embodiment of the present invention. FIG. 2 discloses one embodiment of a semantic tree 3. In the embodiment, the semantic tree 3 indicates tree-type semantic logic and is built by reference to semantics. The semantic tree 3 comprises two or more layers, which means every vocabulary in the semantic tree 3 at least comprises one parent-category and one subcategory.

In the embodiment shown in FIG. 2, the semantic tree 3 includes a "Car" category, a "Monitor" category and a "Phone" category below "Root". If the Car category is regarded as a parent-category, at least three subcategories such as a "Bicycle" category, a "Motorbike" category and an "Automobile" category are included below the Car category. In other words, the Car category (parent-category) is a union of the Bicycle category, the Motorbike category and the Automobile category (subcategories).

If the Automobile category is regarded as a parent-category, at least three subcategories such as a "Sports car" category, a "Sedan" category and a "Sightseeing bus" category are included below the Automobile category. That is to say, the Automobile category (parent-category) is a union of the Sports car category, the Sedan category and the Sightseeing bus category (subcategories). If the Sports car category is regarded as a parent-category, at least two subcategories such as a "2D sports car" category and a "3D sports car" category are included below the Sports car category. If the 2D sports car category is regarded as a parent-category, at least two subcategories such as a "Wheel" category and a "Car door" category are included below the 2D sports car category.

Similarly in FIG. 2, if the Monitor category is regarded as a parent-category, at least three subcategories such as a "Phone monitor" category, a "Computer monitor" category and a "TV monitor" category are included below the Monitor category. In other words, the Monitor category (parent-category) is a union of the Phone monitor category, the Computer monitor category and the TV monitor category. If the Phone category is regarded as a parent-category, at least three subcategories such as a "Phone monitor" category, a "Back cover of phone" category and a "Phone shield" category are included below the Phone category. In other words, the Phone category (parent-category) is a union of the Phone monitor category, the Back cover of phone category and the Phone shield category (subcategories).

It should be mentioned that the semantic tree 3 indicates a tree-type semantic structure built according to recognition demand. When training the classifiers, the structure of the semantic tree 3 is used to perform training to each corresponding classifier (including parent-classifiers and child-classifiers). The type and the amount of subcategories below a parent-category depend on the real recognition demand. In one embodiment shown in FIG. 2, the Monitor category only includes three subcategories (such as the Phone monitor subcategory, the Computer monitor subcategory and the TV monitor subcategory), but the type and the amount of the subcategories may be adjusted according to real demand, not limited thereto.

In one aspect of the present invention, the recognition platform may inquire the semantic tree 3 when performing the recognition action to a target video, so as to analyze and determine whether recognition results of multiple targets in the target video will cause confusion or not. Therefore, the recognition platform may decide to use parent-classifiers respectively corresponding to parent-categories of the targets to be recognized to perform the recognition action, or use child-classifiers respectively corresponding to subcategories below the targets to be recognized to perform the recognition action (detailed described in the following). In particular, the names of the parent-categories of the targets are the same as the names of the targets to be recognized.

Figure 3:
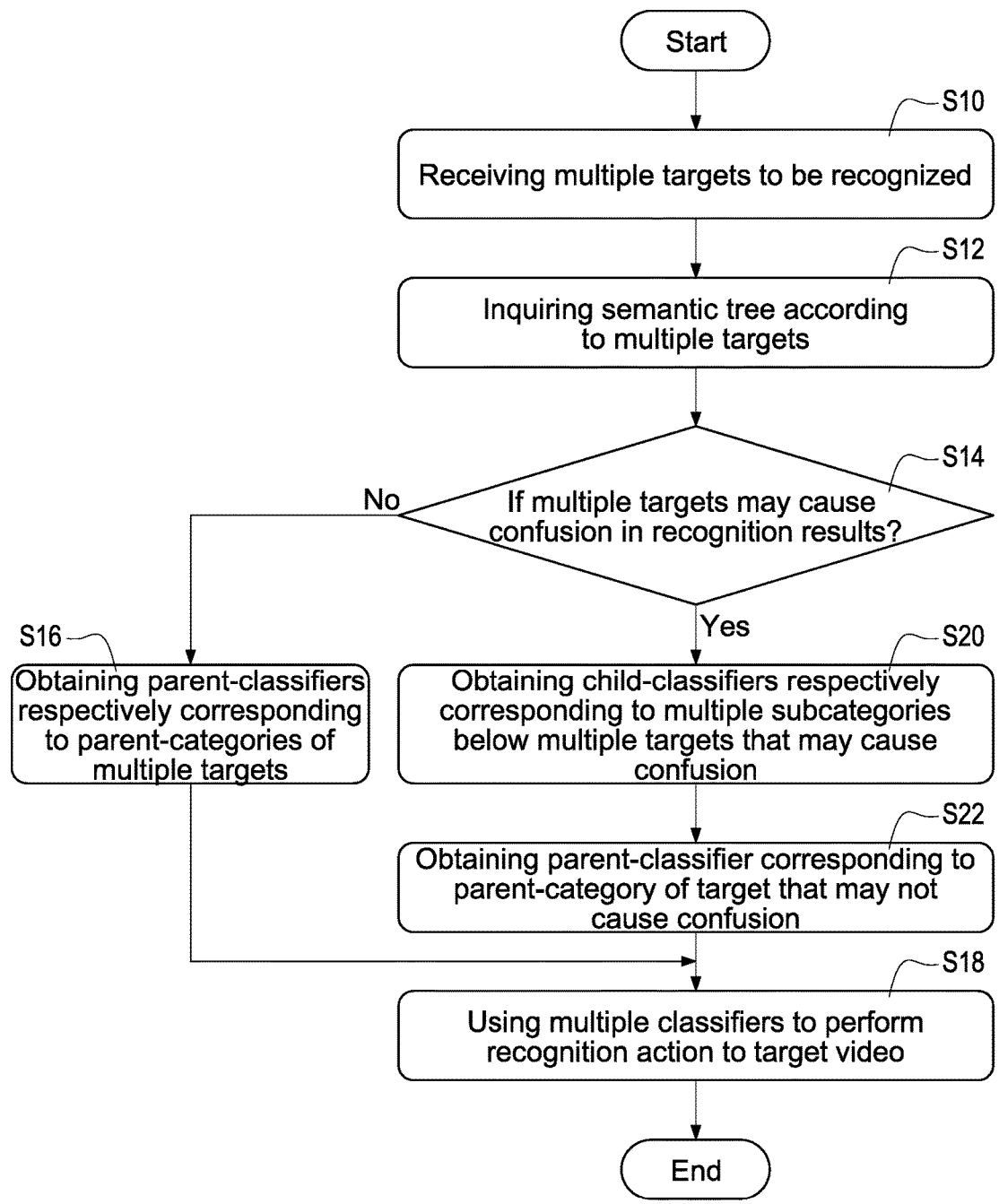
FIG. 3 is a recognition flowchart according to one embodiment of the present invention.

FIG. 3 is a recognition flowchart according to one embodiment of the present invention. In one embodiment, the recognition platform receives multiple targets to be recognized (step S10), wherein the multiple targets are respectively belonging to different parent-categories (such as a Phone category, a TV category, a Monitor category, etc.). The parent-classifiers respectively corresponding to each of the parent-categories are well-trained in advance and may be obtained and used directly by the recognition platform.

In one embodiment, the multiple child-classifiers (such as a Phone monitor classifier, a TV monitor classifier, etc.) respectively corresponding to multiple subcategories below each of the parent-categories are also well-trained in advance and may be obtained and used directly by the recognition platform. In the embodiment, the relationship among these parent-categories and subcategories is the same as the definition indicated by the semantic tree 3.

After the step S10, the recognition platform inquiries the semantic tree 3 according to the multiple targets (step S12), so as to determine if the multiple targets may cause confusion in their recognition results (step S14).

In one aspect of the present invention, the recognition platform determines that two recognition results of two targets may cause confusion if any subcategory below one of the two targets is overlapping with any subcategory below another target. For example, in FIG. 2, the Phone monitor subcategory below the Phone category is overlapped with other Phone monitor subcategory below the Monitor category. If the targets to be recognized inputted by the user comprise "Phone" and "Monitor", the recognition platform will determine that the recognition results of these two targets (i.e., Phone and Monitor) will cause confusion (for example, it may identify a phone appeared in the target video as a monitor).

As mentioned above, if the recognition platform determines in the step S14 that the recognition results of the multiple targets may not cause confusion (i.e., no overlapped subcategory exists below the multiple targets), the recognition platform then obtains parent-classifiers respectively corresponding to the parent-categories of the multiple targets (step S16), and uses the parent-classifiers to perform a recognition action to the target video (step S18).

For example, if the multiple targets inputted by the user include "Phone" and "Automobile", the recognition platform may determine that no overlapped subcategories exist below a Phone category and an Automobile category after inquiring the semantic tree 3, and uses a phone classifier and an automobile classifier corresponding to the parent-categories (i.e., parent-classifiers) to perform the recognition action to the target video.

For another example, if the recognition platform determines in the step S14 that the recognition results of the multiple targets may cause confusion (i.e., at least one overlapped subcategory exists below the multiple targets), the recognition platform then obtains multiple child-classifiers respectively corresponding to multiple subcategories below the multiple targets that may cause confusion (step S20), and uses the child-classifiers to perform the recognition action to the target video. In one embodiment, the parent-categories described in the step S16 are unions of the subcategories described in the step S20.

For a further example, if the multiple targets inputted by the user include "Phone" and "Monitor", the recognition platform may determine that an overlapped Phone monitor subcategory exists below a Phone category and a Monitor category after inquiring the semantic tree 3. In this case, the recognition platform does not use a phone classifier and a monitor classifier directly corresponding to the parent-categories of the multiple targets (i.e., parent-classifiers) to perform the recognition action to the target video, but uses multiple child-classifiers below the multiple targets, such as a Phone monitor classifier, a Back cover of phone classifier, a Phone shield classifier, a TV monitor classifier, a Computer monitor classifier, etc., to perform the recognition action to the target video.

It should be mentioned that if the multiple targets inputted by the user include targets that may cause confusion in the recognition results (such as "Phone" and "Monitor") and also include another target that may not cause confusion in the recognition result (such as "Automobile"), the recognition platform may further obtain a parent-classifier corresponding to the parent-category of the another target that may not cause confusion (step S22). The recognition platform then simultaneously uses the multiple child-classifiers obtained in the step S20 and the parent-classifier obtained in the step S22 to perform the recognition action to the target video (step S18).

The subcategories described in the step S20 and the parent-categories described in the step S22 are belonging to different layers in the semantic tree 3. As the semantic tree 3 shown in FIG. 2, the Car category, the Monitor category and the Phone category belong to same layer, the recognition results of the Monitor category and the Phone category may cause confusion. As a result, when performing the recognition action, the recognition platform uses the Car category (regarded as a parent-category), the Phone monitor category, the Back cover of phone category and the Phone shield category (regarded as subcategories) below the Monitor category and the Phone category (regarded as parent-categories), to perform the recognition action to the target video.

Figure 4A:
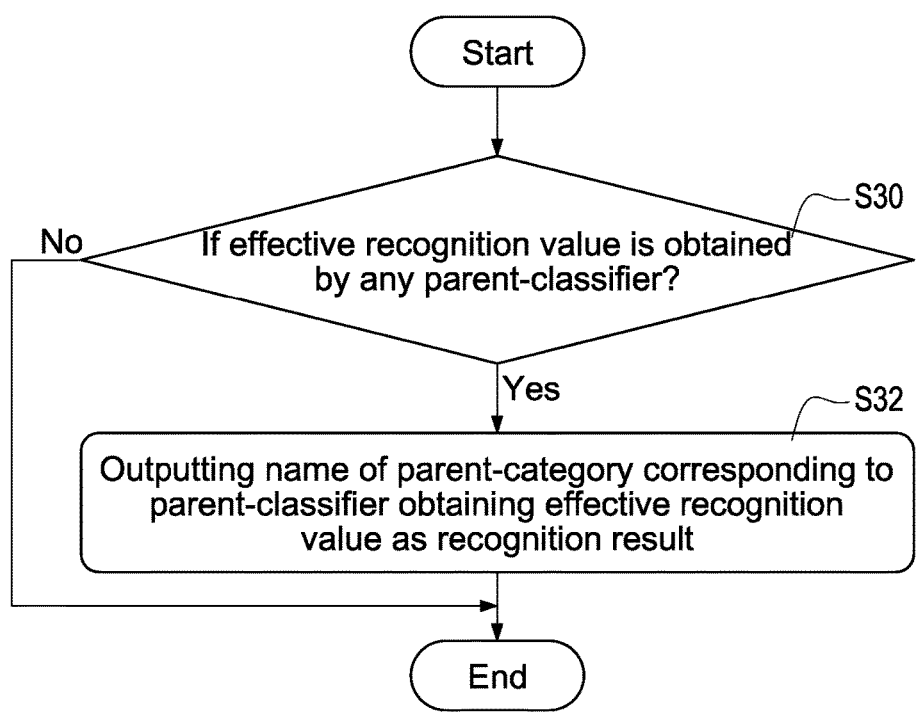
FIG. 4A is an outputting flowchart for recognition result according to one embodiment of the present invention.

FIG. 4A is an outputting flowchart for recognition result according to one embodiment of the present invention. FIG. 4A describes an embodiment showing how the recognition platform submits the recognition results to the user when determining that the recognition results of the multiple targets may not cause confusion.

In the embodiment, the recognition platform uses the parent-classifiers obtained in the step S16 of FIG. 3 to perform an analysis action to the target video, and determines if an effective recognition value is obtained by any of the parent-classifiers (step S30). In particular, if any one of the parent-classifiers (for example, a Car classifier) determines that a corresponding object (i.e., a car) appears in one frame of the target video during the analysis action, the parent-classifier obtains a recognition value as 1 (i.e., regarded as the effective recognition value), otherwise it obtains the recognition value as 0 (i.e., regarded as an ineffective recognition value).

After the step S30, if any one of the parent-classifiers obtains the effective recognition value, the recognition platform may output the name of the parent-category corresponding to the parent-classifier obtaining the effective recognition value as a recognition result of the corresponding target (step S32). In particular, if the Car classifier recognizes successfully and obtains the effective recognition value, the recognition platform may directly output "Car" as a recognition result of the corresponding target.

Figure 4B:
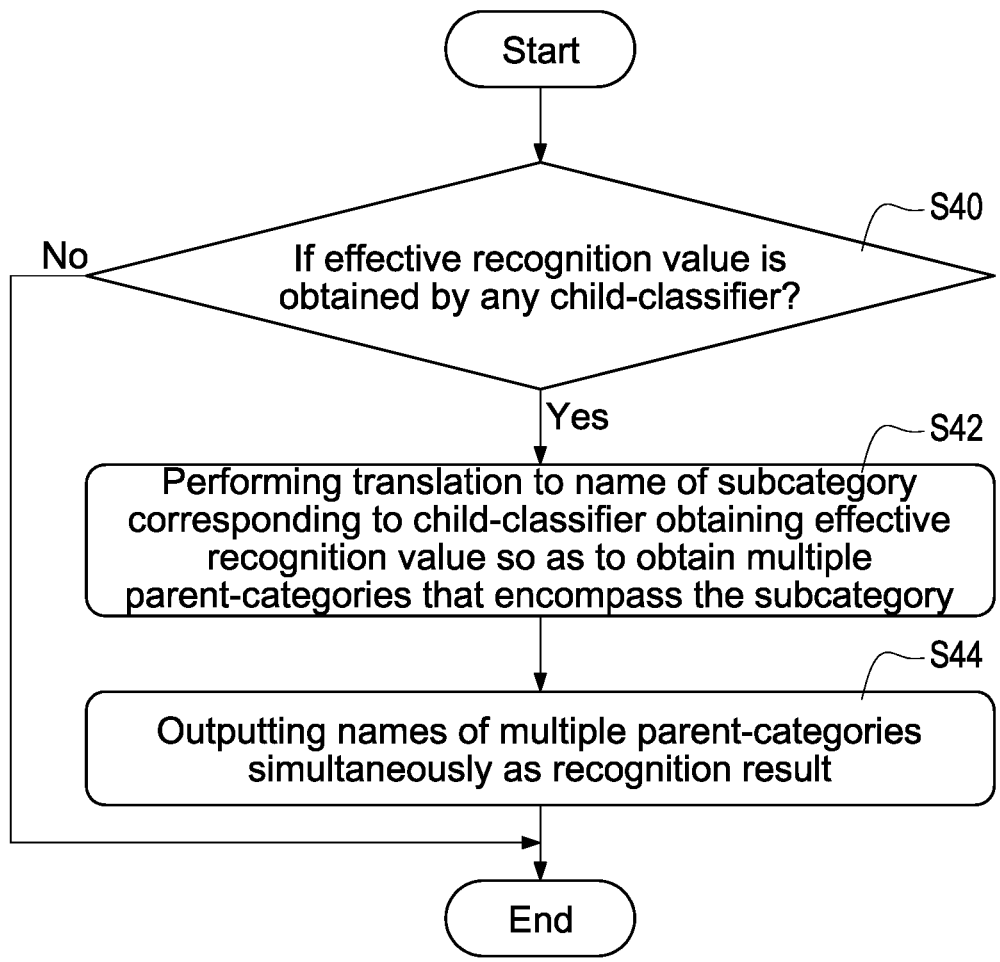
FIG. 4B is an outputting flowchart for recognition result according to one embodiment of the present invention.

FIG. 4B is an outputting flowchart for recognition result according to one embodiment of the present invention. FIG. 4B describes an embodiment showing how the recognition platform submits the recognition results to the user when determining that the recognition results of the multiple targets may cause confusion.

In the embodiment, the recognition platform uses the child-classifiers obtained in the step S20 of FIG. 3 to perform an analysis action to the target video, and determines if an effective recognition value is obtained by any of the child-classifiers (step S40). If any one of the child-classifiers obtains the effective recognition value, the recognition platform performs a translation to the name of the subcategory corresponding to the child-classifier obtaining the effective recognition value, so as to obtain multiple parent-categories that encompass the subcategory (step S42). Next, the recognition platform outputs the names of the multiple parent-categories simultaneously as a recognition result of the corresponding object (step S44).

For example, if the Phone monitor classifier (regarded as a child-classifier) recognizes successfully, the recognition platform performs a translation to the Phone monitor subcategory, so as to obtain the Phone category and the Monitor category (belonging to parent-category, wherein the Phone category encompasses the Phone monitor subcategory and the Monitor category also encompasses the Phone monitor subcategory). Next, the recognition platform may output "Phone" and "Monitor" simultaneously as a recognition result of the corresponding object.

Figure 5:
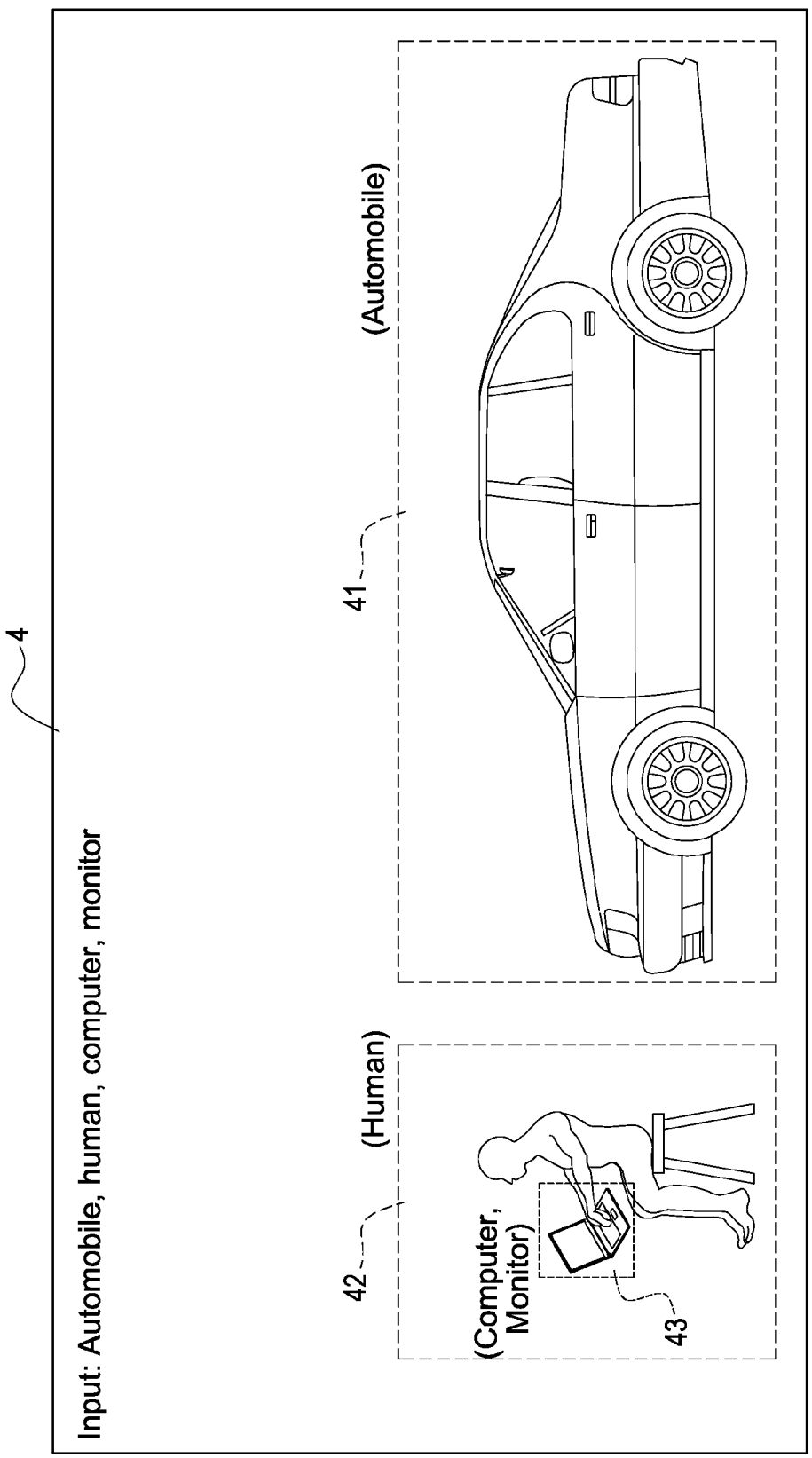
FIG. 5 is a schematic view of image recognition according to one embodiment of the present invention.

FIG. 5 is a schematic view of image recognition according to one embodiment of the present invention. In the embodiment shown in FIG. 5, the recognition platform receives four targets inputted by the user such as "Car", "Human", "Computer" and "Monitor", and uses classifiers respectively corresponding to these targets to perform an analysis action to a video 4.

In one embodiment, the recognition platform inquires the semantic tree 3 according to the four targets, and determines that the "Car" target may not cause confusion with the "Human" target, the "Computer" target and the "Monitor" target in recognition results, so the recognition platform obtains a parent-classifier corresponding to a parent-category of the "Car" target and uses the parent-classifier to perform the analysis action, and obtains a recognition result showing that a first object 41 in the video 4 as a car.

In one embodiment, the recognition platform determines that the "Human" target may not cause confusion with the "Car" target, the "Computer" target and the "Monitor" target in recognition results after inquiring the semantic tree 3, so the recognition platform obtains a parent-classifier corresponding to a parent-category of the "Human" target and uses the parent-classifier to perform the analysis action, and obtains a recognition result showing that a second object 42 in the video 4 as a human.

In one embodiment, after inquiring the semantic tree 3, the recognition platform determines that Computer category and Monitor category may comprise the same subcategory which is the Computer monitor subcategory, so the "Computer" target and the "Monitor" target may cause confusion in recognition results. Therefore, the recognition platform does not use the parent-classifiers respectively corresponding to the two parent-categories of the "Computer" target and the "Monitor" target, but uses multiple child-classifiers respectively corresponding to multiple subcategories below the two parent-categories, such as a Computer keyboard classifier, a Computer shield classifier, a Computer monitor classifier, a Phone monitor classifier, etc., to perform the analysis action to the video 4.

In the embodiment shown in FIG. 5, the Computer monitor classifier recognizes a third object 43 of the video 4 successfully after the analysis action and obtains the effective recognition value. However, the targets inputted by the user is "Computer" and "Monitor", so the recognition platform may not output "Computer monitor" directly as a recognition result of the third object 43. In this embodiment, the recognition platform performs a translation to "Computer monitor", so as to obtain the Computer category and also the Monitor category that encompass the Computer monitor subcategory. Next, the recognition platform outputs "Computer" and "Monitor" simultaneously as a recognition result of the third object 43. Therefore, the recognition platform may output the recognition result that can satisfy user demand and also prevent the recognition results from confusion.

In the aforementioned embodiments, the multiple targets to be recognized are objects of the images or the videos. In other embodiments, the method may also be used to recognize scenes of the images or the videos, not limited thereto.

Figure 6A:
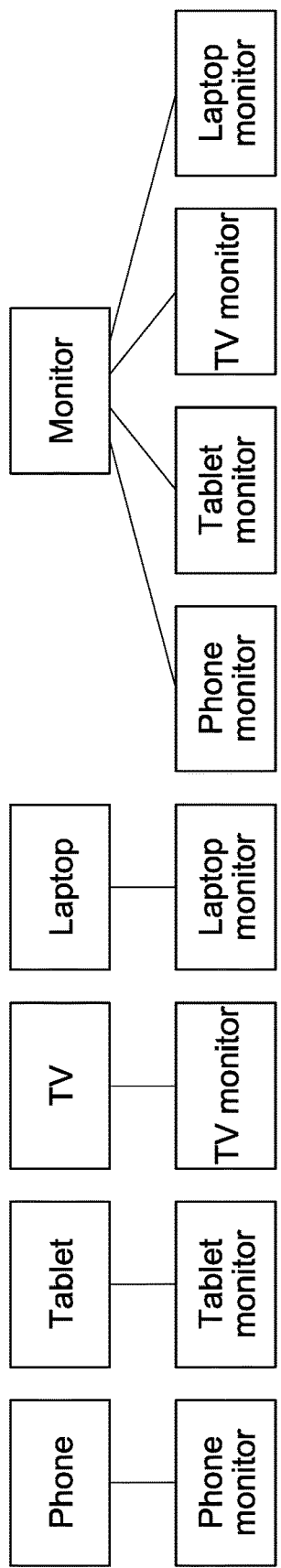
FIG. 6A is a diagram of first embodiment showing confusion of an object recognition result.

FIG. 6A is a diagram of the first embodiment showing confusion of an object recognition result. The parent-categories shown in FIG. 6A, such as a Phone category, a Tablet category, a Laptop category and a Monitor category all have a common feature that is the Monitor feature, so their recognition results may cause confusion. As a result, if the multiple targets to be recognized and inputted by the user include these parent-categories simultaneously, the recognition platform may use the child-classifiers corresponding to a Phone monitor subcategory, a Tablet monitor subcategory, a TV monitor subcategory, a Laptop subcategory, etc., to perform the analysis action to the video, so as to prevent the recognition results from mis-recognizing phones, tablets, TVs or laptops as a monitor.

Figure 6B:
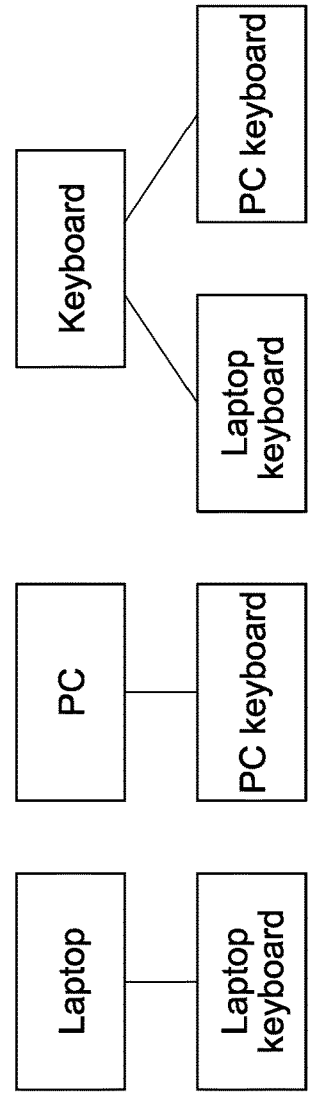
FIG. 6B is a diagram of second embodiment showing confusion of an object recognition result.

FIG. 6B is a diagram of the second embodiment showing confusion of an object recognition result. The parent-categories shown in FIG. 6B, such as a Laptop category, a PC category and a Keyboard category all have a common feature that is the Keyboard feature, so their recognition results may cause confusion. As a result, if the multiple targets to be recognized and inputted by the user include these parent-categories simultaneously, the recognition platform may use the child-classifiers corresponding to a Laptop keyboard subcategory, a PC keyboard subcategory, etc., to perform the analysis action to the video, so as to prevent the recognition results from mis-recognizing laptops or PCs as a keyboard.

Figure 6C:
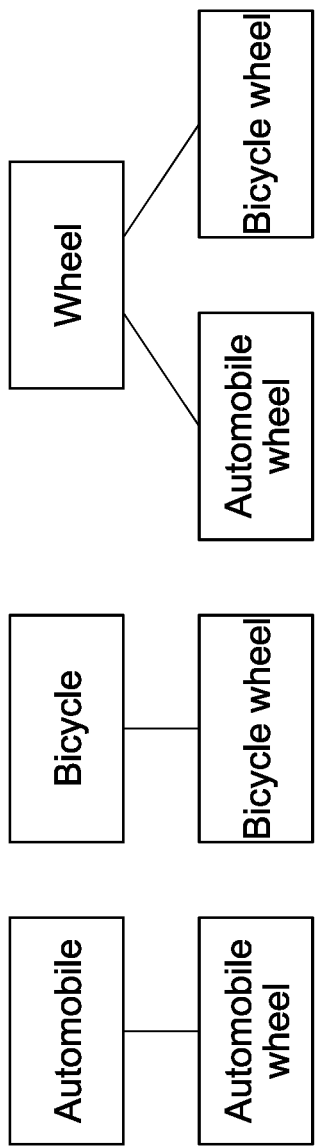
FIG. 6C is a diagram of third embodiment showing confusion of an object recognition result.

FIG. 6C is a diagram of the third embodiment showing confusion of an object recognition result. The parent-categories shown in FIG. 6C, such as an Automobile category, a Bicycle category and a Wheel category all have a common feature that is the Wheel feature, so their recognition results may cause confusion. As a result, if the multiple targets to be recognized inputted by the user include these parent-categories simultaneously, the recognition platform may use the child-classifiers corresponding to an Automobile wheel subcategory, a Bicycle wheel subcategory, etc., to perform the analysis action to the video, so as to prevent the recognition results from mis-recognizing automobiles or bicycles as a wheel.

Figure 6D:
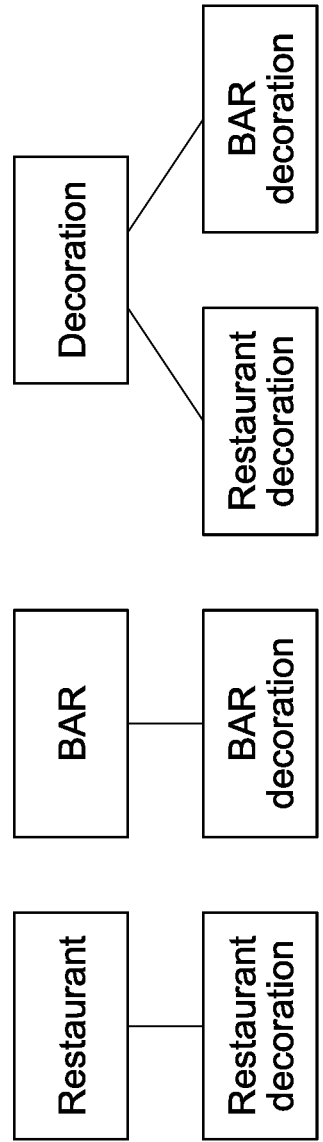
FIG. 6D is a diagram of first embodiment showing confusion of a scene recognition result.

FIG. 6D is a diagram of the first embodiment showing confusion of a scene recognition result. The parent-categories shown in FIG. 6D, such as a Restaurant category, a BAR category and a Decoration category all have a common feature that is the Decoration feature, so their recognition results may cause confusion. As a result, if the multiple targets inputted by the user include these parent-categories simultaneously, the recognition platform may use the child-classifiers corresponding to a Restaurant decoration subcategory, a BAR decoration subcategory, etc., to perform the analysis action to the video, so as to prevent the recognition results from mis-recognizing restaurants or BARs as only a decoration.

According to the embodiments of the present invention, the method may increase the accuracy rate of recognizing images and videos, prevent the recognition results from confusion, and provide the recognition results that can satisfy user demand.

As the skilled person will appreciate, various changes and modifications can be made to the described embodiment. It is intended to include all such variations, modifications and equivalents which fall within the scope of the present invention, as defined in the accompanying claims.

What is claimed is:

1. An image recognizing method adopted by a recognition platform, the image recognizing method comprising:
   a) receiving multiple targets to be recognized at the recognition platform;
   b) providing a semantic tree to be inquired according to the multiple targets to determine whether recognition results of the multiple targets may cause confusion or not, wherein two of the multiple targets cause confusion in the recognition results when a subcategory below any one of the multiple targets is overlapped with other subcategory below another of the multiple targets;
   c) obtaining multiple parent-classifiers respectively corresponding to multiple parent-categories of the multiple targets if the recognition results of the multiple targets do not cause confusion;

d) using the parent-classifiers to perform a recognition action to a target video at the recognition platform after the step c;

e) obtaining multiple child-classifiers respectively corresponding to multiple subcategories below each of the multiple targets if the recognition results of the multiple targets cause confusion, wherein the multiple parent-categories are unions of the multiple subcategories;

f) obtaining a specific parent-classifier corresponding to specific parent-category of one of the multiple targets that do not cause confusion if the multiple targets cause confusion in the recognition results;

g) using the specific parent-classifier and the multiple child-classifiers to perform the recognition action to the target video after the step f;

h) determining whether any of the multiple child-classifiers obtains an effective recognition value after the step g;

i) performing a translation to a name of the subcategory corresponding to the child-classifier obtaining the effective recognition value in order to obtain multiple parent-categories that encompass the subcategory; and j) outputting names of the multiple parent-categories as a recognition result.

2. The image recognition method in claim 1, further comprising following steps of:

k) determining whether any of the multiple parent-classifiers obtains an effective recognition value after the step d; and l) outputting a name of the parent-category corresponding to the parent-classifier obtaining the effective recognition value as recognition result.

3. The image recognition method in claim 1, wherein the multiple targets comprise objects or scenes.

4. The image recognition method in claim 3, wherein the multiple parent-categories comprise a Phone category, a Tablet category, a TV category, a Laptop category and a Monitor category, and the multiple subcategories comprise a Phone monitor category, a Tablet monitor category, a TV monitor category and a Laptop monitor category.

5. The image recognition method in claim 3, wherein the multiple parent-categories comprise a Laptop category, a PC category and a Keyboard category, and the multiple subcategories comprise a Laptop keyboard category and a PC keyboard category.

6. The image recognition method in claim 3, wherein the multiple parent-categories comprise an Automobile category, a Bicycle category and a Wheel category, and the multiple subcategories comprise an Automobile wheel category and a Bicycle wheel category.

7. The image recognition method in claim 3, wherein the multiple parent-categories comprise a Restaurant category, a BAR category and a Decoration category, and the multiple subcategories comprise a Restaurant decoration category and a BAR decoration category.

* * * * *